US010555060B2

(12) United States Patent
Miyasaka et al.

(10) Patent No.: US 10,555,060 B2
(45) Date of Patent: Feb. 4, 2020

(54) ACOUSTIC DEVICE AND MOBILE OBJECT (71) Applicant: SOCIONEXT INC., Kanagawa (JP)

(72) Inventors: Shuji Miyasaka, Yokohama (JP);
Kazutaka Abe, Yokohama (JP);
Katsumi Kobayashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 16/419,793

(22) Filed: May 22, 2019

(65) Prior Publication Data

US 2019/0273977 A1    Sep. 5, 2019

Related U.S. Application Data

(63) Continuation of application No. PCT/JP2017/032145, filed on Sep. 6, 2017.

(30) Foreign Application Priority Data

Nov. 25, 2016    (JP) .................................. 2016-229556

(51) Int. Cl.
*H04R 1/02* (2006.01)
*B62D 1/04* (2006.01)
(Continued)

(52) U.S. Cl.
CPC ............... *H04R 1/028* (2013.01); *B62D 1/04* (2013.01); *H04R 1/025* (2013.01); *H04R 5/02* (2013.01);
(Continued)

(58) Field of Classification Search
CPC .......... H04R 1/028; H04R 1/025; H04R 5/02; H04R 2499/13; H04S 7/30; H04S 2400/01; B62D 1/04
(Continued)

(56) References Cited

U.S. PATENT DOCUMENTS 4,850,015 A    7/1989  Martin
9,107,021 B2*  8/2015  Florencio ................ H04S 1/007
(Continued)

FOREIGN PATENT DOCUMENTS

JP    S63-281600 A    11/1988
JP    2005-125843 A    5/2005
(Continued)

OTHER PUBLICATIONS

International Search Report and Written Opinion dated Oct. 10, 2017 in International Application No. PCT/JP2017/032145; with partial English translation.

*Primary Examiner* — Jason R Kurr
(74) *Attorney, Agent, or Firm* — McDermott Will & Emery LLP (57) ABSTRACT

An acoustic device that provides a stereophonic effect to a driver of a mobile object includes: a plurality of speakers (an L channel speaker and an R channel speaker) mounted on a steering wheel that controls a traveling direction of the mobile object; a steering angle detection unit configured to detect a steering angle of the steering wheel; and a signal output unit configured to output a plurality of output signals obtained by performing, on a sound signal, a process relating to the stereophonic effect and depending on the steering angle, respectively to the plurality of speakers.

6 Claims, 7 Drawing Sheets

(51) Int. Cl.
*H04R 5/02* (2006.01)
*H04S 7/00* (2006.01)
(52) U.S. Cl.
CPC ............ *H04S 7/30* (2013.01); *H04R 2499/13* (2013.01); *H04S 2400/01* (2013.01)
(58) Field of Classification Search
USPC .......................................................... 381/86
See application file for complete search history.

(56) References Cited

U.S. PATENT DOCUMENTS

| | | | | |
|---|---|---|---|---|
| 2003/0142835 | A1* | 7/2003 | Enya | B60R 11/0217 |
| | | | | 381/86 |
| 2009/0316939 | A1* | 12/2009 | Matsumoto | H04R 5/04 |
| | | | | 381/302 |
| 2011/0101654 | A1* | 5/2011 | Cech | B60R 11/0247 |
| | | | | 280/728.3 |
| 2016/0295342 | A1 | 10/2016 | Miyasaka et al. | |

FOREIGN PATENT DOCUMENTS

| | | |
|---|---|---|
| JP | 2012-201162 A | 10/2012 |
| WO | 2015/087490 A1 | 6/2015 |

\* cited by examiner

ACOUSTIC DEVICE AND MOBILE OBJECT

CROSS REFERENCE TO RELATED APPLICATION

This is a continuation application of PCT International Application No. PCT/JP2017/032145 filed on Sep. 6, 2017, designating the United States of America, which is based on and claims priority of Japanese Patent Application No. 2016-229556 filed on Nov. 25, 2016. The entire disclosures of the above-identified applications, including the specifications, drawings and claims are incorporated herein by reference in their entirety.

FIELD

The present disclosure relates to an acoustic device that provides a stereophonic effect to a driver in a mobile object (e.g. a vehicle, a ship, etc.) including a steering wheel, and a mobile object including the acoustic device.

BACKGROUND

Figure 10:
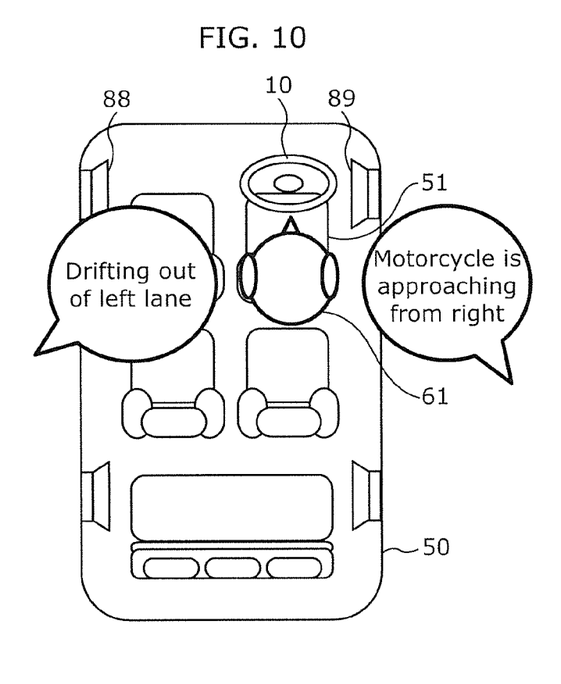
FIG. 10 is a diagram illustrating how to effectively deliver an alert message to a driver in a vehicle.

In recent years, the development of advanced driving assistant system (ADAS) technologies has made it possible to automatically detect the presence of dangerous objects, such as pedestrians and motorcycles, which drivers of vehicles need to avoid with caution, and notify the drivers of the presence of dangerous objects by sound messages. In such a case, a driver is more alerted to a dangerous object if he or she hears an alert message from the direction in which the dangerous object is present. For example, in the case where the dangerous object is on the right side of the driver, the warning is given near the right ear of the driver. FIG. 10 is a diagram illustrating how to effectively deliver an alert message to a driver 61 in a vehicle 50. As illustrated in FIG. 10, for example in the case where a motorcycle is approaching on the right side of the vehicle 50, the sound "motorcycle is approaching from right" is produced near the right ear of the driver 61 driving in the driver's seat 51 of the vehicle 50. For example in the case where the vehicle 50 is drifting out of the left lane, the sound "drifting out of left lane" is produced near the left ear of the driver 61. To produce such sound near the left and right ears of the driver 61, a sound signal input to each of an L channel (left channel) speaker 88 and an R channel (right channel) speaker 89 included in the vehicle 50 is processed as appropriate.

Automated driving technologies have advanced in recent years, and more driving operations are likely to be automated in the future. However, fully automated driving has not been achieved yet. In the case where control by automated driving is difficult, control needs to be transferred to the driver so that the driver performs driving operation. In this case, the driver needs to be in a comfortable awake state without being sleepy. To keep the driver in a comfortable awake state, giving a message in the ear to urge the driver to be awake is effective in the case where the driver appears to be sleepy. For example, a message such as "Hey, wake up." may be given near the driver's ear.

Figure 11:
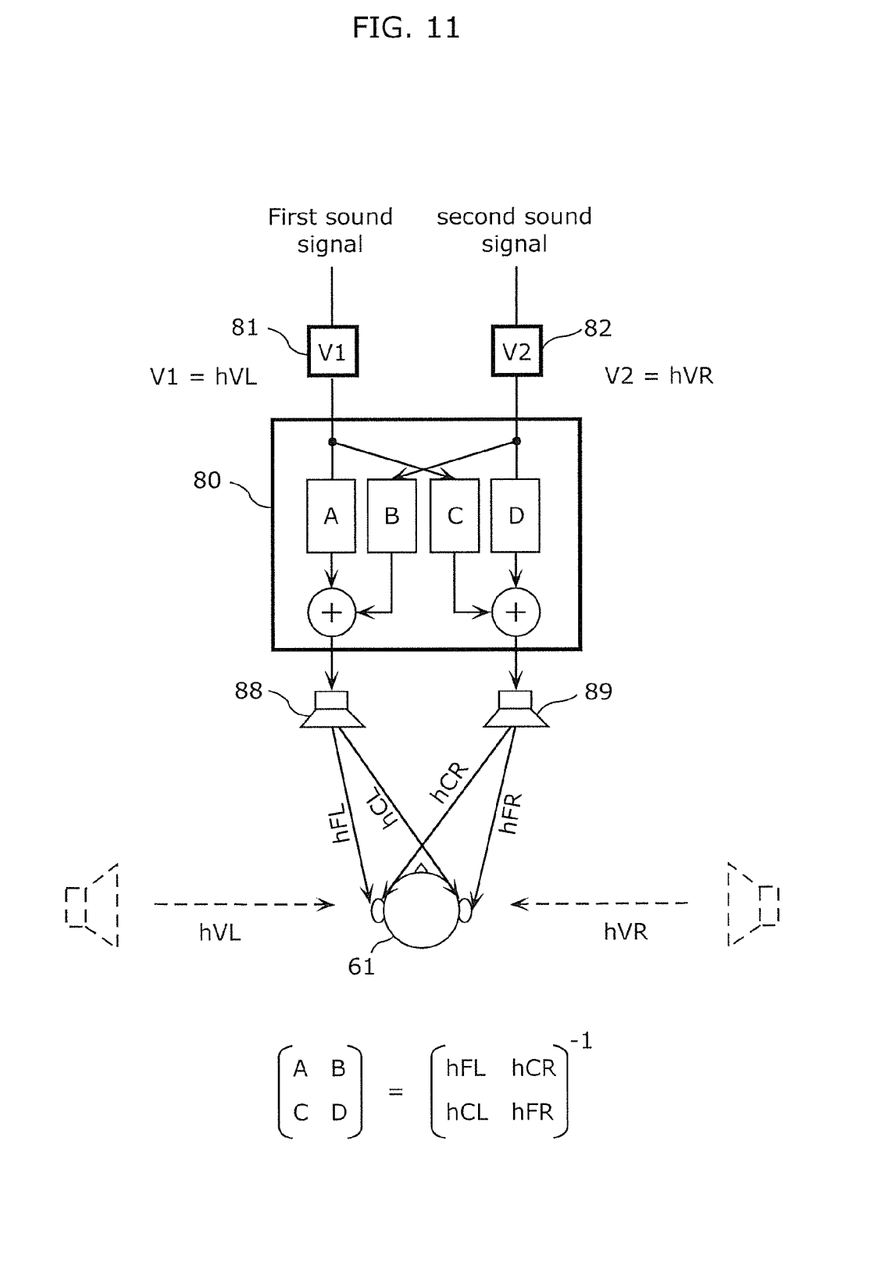
FIG. 11 is a block diagram schematically illustrating a process of producing sound near the ears.

A technique of producing sound near the ears will be described below, with reference to FIG. 11. FIG. 11 is a block diagram schematically illustrating a process of producing sound near the ears. FIG. 11 illustrates an example of a process of simultaneously producing sound near the left and right ears of the driver 61.

As illustrated in FIG. 11, sound is generated by processing a first sound signal and a second sound signal by virtual sound image localization filters 81 and 82 and a crosstalk cancellation unit 80. The first sound signal is a signal representing sound to be produced near the left ear of the driver 61, and the second sound signal is a signal representing sound to be produced near the right ear of the driver 61.

The virtual sound image localization filter 81 is designed so that the sound of the sound signal input to the filter is heard from the left direction of the driver 61, that is, the sound of the sound signal is localized on the left side of the driver 61. In other words, the virtual sound image localization filter 81 is designed to localize the sound of the sound signal to a predetermined position so that the sound is perceived with enhancement in the position of the left ear of the driver 61 facing the L channel speaker 88 and the R channel speaker 89. Specifically, the virtual sound image localization filter 81 is a filter representing a transfer function (V1=hVL) of sound from a sound source placed in the left direction of the driver 61 to the left ear of the driver 61.

The virtual sound image localization filter 82 is designed so that the sound of the sound signal input to the filter is heard from the right direction of the driver 61, as with the virtual sound image localization filter 81. Specifically, the virtual sound image localization filter 82 is a filter representing a transfer function (V2=hVR) of sound from a sound source placed in the right direction of the driver 61 to the right ear of the driver 61.

The first sound signal processed in the virtual sound image localization filter 81 is input to one input terminal of the crosstalk cancellation unit 80. The second sound signal processed in the virtual sound image localization filter 82 is input to another input terminal of the crosstalk cancellation unit 80.

The crosstalk cancellation unit 80 is a processing unit that performs a cancellation process of preventing the sound of the sound signal to be perceived in one ear of the driver 61 from being perceived in the other ear of the driver 61, on the sound signal.

The crosstalk cancellation process includes a process of multiplication by transfer functions A, B, C, and D, a process of addition of a signal multiplied by the transfer function A and a signal multiplied by the transfer function B, and a process of addition of a signal multiplied by the transfer function C and a signal multiplied by the transfer function D. In other words, the crosstalk cancellation process is a process using the inverse of a 2×2 matrix having, as elements, transfer functions of sounds output from the L channel speaker 88 and the R channel speaker 89 and reaching the ears of the driver 61. The transfer functions A, B, C, and D are determined based on transfer functions hFL and hCL from the L channel speaker 88 to the respective left and right ears of the driver 61 and transfer functions hCR and hFR from the R channel speaker 89 to the respective left and right ears of the driver 61.

In FIG. 11, the transfer functions hFL, hCL, hFR, and hCR indicating the transfer characteristics from the L channel speaker 88 and the R channel speaker 89 to the left and right ears of the driver are functions calculated or measured beforehand. The transfer functions hVL and hVR are functions indicating the transfer characteristics of sound from virtual speakers, which are assumed to be placed at the left and right ears, to the ears. The transfer functions A, B, C, and D are functions that serve as filters for realizing the inverse of the characteristics of the acoustic space realized by the transfer functions hFL, hCL, hFR, and hCR. The transfer functions A, B, C, and D are given by the following Formula 1.

[Math. 1]

$$\begin{pmatrix} A & B \\ C & D \end{pmatrix} = \begin{pmatrix} hFL & hCR \\ hCL & hFR \end{pmatrix}^{-1}.$$  Formula 1

The transfer functions V1 and V2 in FIG. 11 are respectively the transfer functions hVL and hVR. With such a structure, the sounds produced from the L channel speaker 88 and the R channel speaker 89 sound as if they are produced near the ears of the driver (Patent Literature (PTL) 1).

As acoustic devices in the interiors of vehicles and the like, a device in which a steering wheel is provided with speakers has been proposed (PTL 2). The device described in PTL 2 is intended to effectively offer call function, music playback function, and the like to the driver by appropriately arranging speakers, microphones, and the like at the steering wheel.

CITATION LIST

Patent Literature

[PTL 1]
International Patent Application Publication No. 2015/087490
[PTL 2]
U.S. Pat. No. 4,850,015

SUMMARY

Technical Problem

The transfer functions hFL, hCL, hFR, and hCR in FIG. 11 are each a transfer function expressed with several hundred taps. These transfer functions are either calculated based on geometric positional relationships beforehand, or measured by arranging sound sources and microphones in such positional relationships beforehand. Hence, even when the above-described acoustic process of producing sound near the ears using the calculated or measured transfer functions A, B, C, and D is performed, in the case where there is an obstacle between the listener and any speaker in an actual reproduction environment, the expected acoustic effect (the effect of reproduction near the ear in the above-described case) cannot be obtained because the transfer characteristics of sound differ from the transfer characteristics calculated or measured beforehand. Particularly in a vehicle interior, the expected acoustic effect is unlikely to be obtained because the speakers are located at the knees of the driver's seat or the front passenger seat or an interior decoration is present between any speaker and the listener. In the case where the speakers are arranged at the steering wheel 10 of the vehicle 50 illustrated in FIG. 10, no obstacle in the sound wave traveling direction is present between the speakers and the listener (driver). However, since the steering wheel itself is movable, the relative positional relationships between the speakers and the listener vary, which can lead to a state not suitable for stereophonic processing.

The present disclosure has been made in view of such conventional problem, and has an object of providing an acoustic device that can provide a stereophonic effect to a driver more reliably, and a mobile object including the acoustic device.

Solution to Problem

To solve the problem stated above, an acoustic device according to an aspect of the present disclosure is an acoustic device that provides a stereophonic effect to a driver of a mobile object, the acoustic device including: a plurality of speakers mounted on a steering wheel that controls a traveling direction of the mobile object; a steering angle detection unit configured to detect a steering angle of the steering wheel; and a signal output unit configured to output a plurality of output signals obtained by performing, on a sound signal, a process relating to the stereophonic effect and depending on the steering angle, respectively to the plurality of speakers.

With this, even in the case where the steering angle of the steering wheel is not 0 (0 degrees), i.e. the positions of the plurality of speakers have changed from the positions in the case where the steering angle is 0, the desired stereophonic effect can be provided to the driver by performing the process (processing) depending on the steering angle to obtain the plurality of output signals. Moreover, by mounting the speakers on the steering wheel, obstacles between the speakers and the driver can be reduced, with it being possible to provide the stereophonic effect more reliably.

In the acoustic device according to an aspect of the present disclosure, the signal output unit may include: a sound signal storage unit configured to store the sound signal; a control unit configured to determine filter coefficients for the process depending on the steering angle; and a signal processing unit configured to perform the process on the sound signal using the filter coefficients, to generate the plurality of output signals.

With this, the plurality of output signals corresponding to the sound signal can be generated by the signal processing unit, so that the plurality of output signals need not be stored in the acoustic device. This reduces the amount of data stored in the acoustic device.

In the acoustic device according to an aspect of the present disclosure, the signal processing unit may be configured to further perform a crosstalk cancellation process on the sound signal.

With this, crosstalk can be suppressed in the acoustic device. This prevents degradation of the stereophonic effect provided by the acoustic device.

In the acoustic device according to an aspect of the present disclosure, the signal output unit may include: an output signal storage unit configured to store a plurality of signal groups respectively associated with a plurality of different steering angles; and a signal selection unit configured to select one signal group corresponding to the steering angle detected by the steering angle detection unit, from the plurality of signal groups, and the plurality of signal groups may each include the plurality of output signals.

With this, the signal output unit does not need to generate the output signals, so that computation in the signal output unit can be reduced.

In the acoustic device according to an aspect of the present disclosure, the plurality of output signals output by the signal output unit in the case where the steering angle is not 0 may be obtained by performing the process for providing a same stereophonic effect as in the case where the steering angle is 0.

With this, even in the case where the positions of the plurality of speakers have changed from the positions in the case where the steering angle is 0, the same stereophonic effect as in the case where the steering angle is 0 can be provided.

In the acoustic device according to an aspect of the present disclosure, the signal output unit may be configured to, in the case where the steering angle is greater than a predetermined angle, output the plurality of output signals that do not provide the stereophonic effect.

With this, in the case where the plurality of speakers are at positions where the stereophonic effect cannot be provided to the driver, the provision of the stereophonic effect can be stopped. This simplifies the process performed for the output signals in the acoustic device.

In the acoustic device according to an aspect of the present disclosure, the signal output unit may be configured to, in the case where a variation of the steering angle per unit time is greater than a predetermined value, output the plurality of output signals that do not provide the stereophonic effect.

In this case, the positions of the plurality of speakers relative to the driver change from moment to moment, making it difficult to ensure the provision of the stereophonic effect. In such a case where the provision of the stereophonic effect is practically difficult, the provision of the stereophonic effect is stopped. This simplifies the process performed for the output signals in the acoustic device 1.

In the acoustic device according to an aspect of the present disclosure, at least two speakers of the plurality of speakers may be arranged on a same arc centered on a rotation axis of the steering wheel, and the at least two speakers may be at a same vertical position in the case where the steering angle is 0.

With this, the speakers are arranged bilaterally symmetrically with respect to the driver located near the rotation axis of the steering wheel. A speaker arrangement that facilitates the provision of the stereophonic effect can thus be realized.

In the acoustic device according to an aspect of the present disclosure, at least two speakers of the plurality of speakers may be arranged symmetrically with respect to a point on a rotation axis of the steering wheel.

With this, the speakers are arranged on both sides of the rotation axis of the steering wheel. Even when the steering wheel is rotated, the two speakers will not be located off to the right side or the left side with respect to the rotation axis of the steering wheel. A speaker arrangement that facilitates the provision of the stereophonic effect can thus be realized.

In the acoustic device according to an aspect of the present disclosure, the plurality of speakers may be arranged symmetrically with respect to a vertical plane including a rotation axis of the steering wheel in the case where the steering angle is 0.

With this, the speakers are arranged bilaterally symmetrically with respect to the driver located near the rotation axis of the steering wheel. A speaker arrangement that facilitates the provision of the stereophonic effect can thus be realized.

To solve the problem stated above, a mobile object according to an aspect of the present disclosure includes: the acoustic device described above; and the steering wheel.

With this, the same effects as the foregoing acoustic device can be achieved.

Advantageous Effects

According to the present disclosure, an acoustic device that can provide a stereophonic effect to a driver more reliably and a mobile object including the acoustic device can be provided.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

Embodiments will be described in detail below, by referring to drawings as appropriate. Herein, description detailed more than necessary may be omitted. For example, detailed description of well-known matters or repeated description of the substantially same structures may be omitted. This is to avoid unnecessarily redundant description and facilitate the understanding of a person skilled in the art.

The accompanying drawings and the following description are provided to help a person skilled in the art to fully understand the present disclosure, and are not intended to limit the subject matter defined in the appended claims.

Embodiment 1

An acoustic device according to Embodiment 1 will be described below.

[1-1. Overall Structure]

The overall structure of the acoustic device according to this embodiment will be described below, with reference to drawings.

Figure 1:
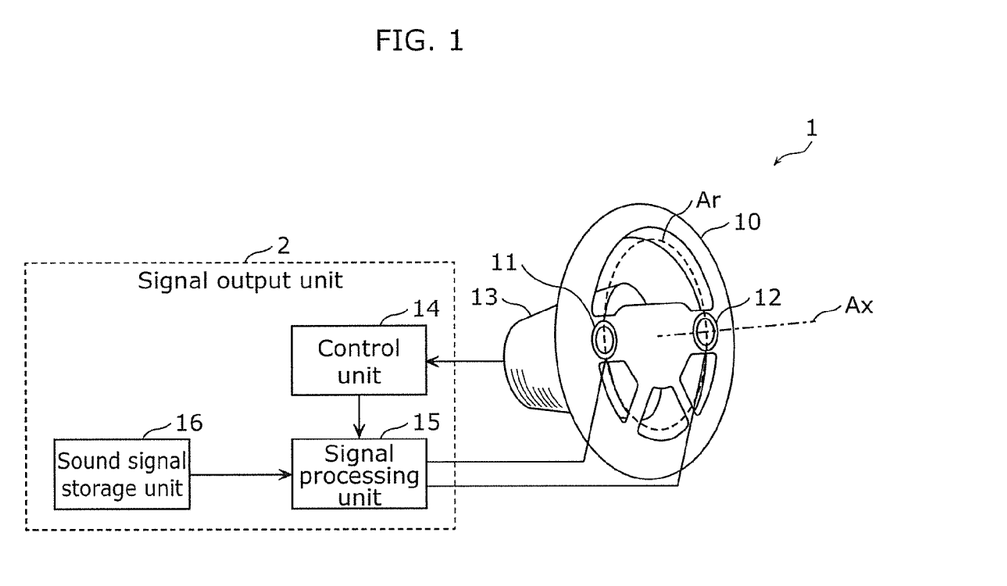
FIG. 1 is a block diagram illustrating the functional structure of an acoustic device according to Embodiment 1.
Figure 2:
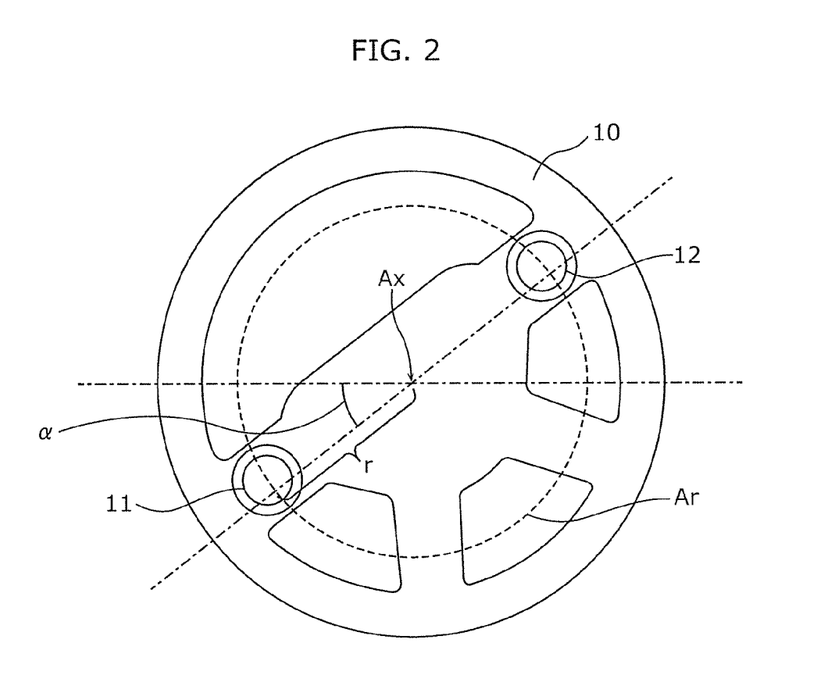
FIG. 2 is a diagram illustrating the steering angle of a steering wheel according to Embodiment 1.

FIG. 1 is a block diagram illustrating the functional structure of an acoustic device 1 according to this embodiment. FIG. 2 is a diagram illustrating the steering angle α of a steering wheel 10 according to this embodiment.

The acoustic device 1 illustrated in FIG. 1 is a device that provides a stereophonic effect to a driver of a mobile object. The mobile object is not limited as long as it is transportation equipment including the steering wheel 10 that controls the traveling direction. Examples include a car and a ship. In this embodiment, the mobile object is a car such as the vehicle 50 illustrated in FIG. 10, and includes the steering wheel 10 having approximately circular outer edges. The steering wheel 10 is an operation component capable of controlling the traveling direction of the mobile object depending on the steering angle α, and is operated by the driver of the mobile object. The steering angle α is the angle of rotation of the steering wheel 10 about the rotation axis Ax with respect to the angle of the steering wheel 10 in the case where the mobile object travels in a straight line, as illustrated in FIG. 2. The rotation axis Ax is located at approximately the center of the steering wheel 10 having approximately circular outer edges.

The acoustic device 1 includes a plurality of speakers (an L channel speaker 11 and an R channel speaker 12), a steering angle detection unit 13, and a signal output unit 2, as illustrated in FIG. 1.

The plurality of speakers are mounted on the steering wheel 10 that controls the traveling direction of the mobile object. The L channel speaker 11 and the R channel speaker 12 are mounted on the steering wheel 10 as the plurality of speakers, as illustrated in FIG. 1. By mounting the plurality of speakers on the steering wheel 10, obstacles between the plurality of speakers and the driver can be reduced, with it being possible to provide the stereophonic effect more reliably. The number of speakers is not limited to two, and may be three or more.

The L channel speaker 11 and the R channel speaker 12 are respective speakers arranged on the left side and the right side of the rotation axis Ax of the steering wheel 10 as seen from the driver facing the steering wheel 10 in the case where the steering angle α is 0 (0 degrees). The L channel speaker 11 and the R channel speaker 12 are arranged on the same arc Ar with a radius r centered on the rotation axis Ax of the steering wheel 10. In other words, the L channel speaker 11 and the R channel speaker 12 are arranged symmetrically with respect to a vertical plane including the rotation axis Ax of the steering wheel 10 in the case where the steering angle α is 0 degrees. Thus, the L channel speaker 11 and the R channel speaker 12 are arranged bilaterally symmetrically with respect to the driver located near the rotation axis Ax of the steering wheel 10. This facilitates the provision of the stereophonic effect.

Moreover, the L channel speaker 11 and the R channel speaker 12 are arranged symmetrically with respect to a point on the rotation axis Ax of the steering wheel 10. Thus, the speakers are arranged on both sides of the rotation axis of the steering wheel. In the case of arranging two speakers in the horizontal direction (i.e. the left-right direction as seen from the driver) with respect to the driver located near the rotation axis of the steering wheel, the speakers are arranged bilaterally symmetrically with respect to the driver. This facilitates the provision of the stereophonic effect.

The above-described arrangement of the speakers may have deviations to such an extent that allows for manufacturing errors. For example, the arrangement of the speakers may have deviations of about 10% of the dimensions (e.g. length) of each speaker.

The steering angle detection unit 13 is a measurement instrument that detects the steering angle α of the steering wheel 10. The steering angle detection unit 13 detects the steering angle α, and outputs, to the signal output unit 2, a signal indicating the latest value of the steering angle α at predetermined time intervals. The method of detecting the steering angle α is not limited. For example, the steering angle detection unit 13 may detect the steering angle α using a magnetoresistive element, optically detect the steering angle α using a light emitting element and a light receiving element, or use other known detection methods. Information of the steering angle α may be obtained from in-vehicle control area network (CAN) information.

The signal output unit 2 is a processing unit that outputs a plurality of output signals to the respective plurality of speakers. In this embodiment, for example, the signal output unit 2 outputs one of two output signals to the L channel speaker 11 and the other one of the output signals to the R channel speaker 12. That is, the two output signals correspond one-to-one to the two speakers. Each of the plurality of output signals output by the signal output unit 2 is a signal obtained by performing, on a sound signal, a process relating to the stereophonic effect and depending on the steering angle α. Thus, even in the case where the steering angle α of the steering wheel 10 is not 0 degrees, i.e. the positions of the speakers have changed from the positions in the case where the steering angle α is 0 degrees, the desired stereophonic effect can be provided to the driver by performing the process depending on the steering angle α to obtain the plurality of output signals.

The signal output unit 2 includes a control unit 14, a signal processing unit 15, and a sound signal storage unit 16, as illustrated in FIG. 1.

The control unit 14 is a processing unit that determines filter coefficients for the process performed on the sound signal, depending on the steering angle α detected by the steering angle detection unit 13. The control unit 14 receives a signal indicating the value of the steering angle α detected by the steering angle detection unit 13, and determines filter coefficients corresponding to the steering angle α. The control unit 14 will be described in detail below, with reference to FIG. 3.

Figure 3:
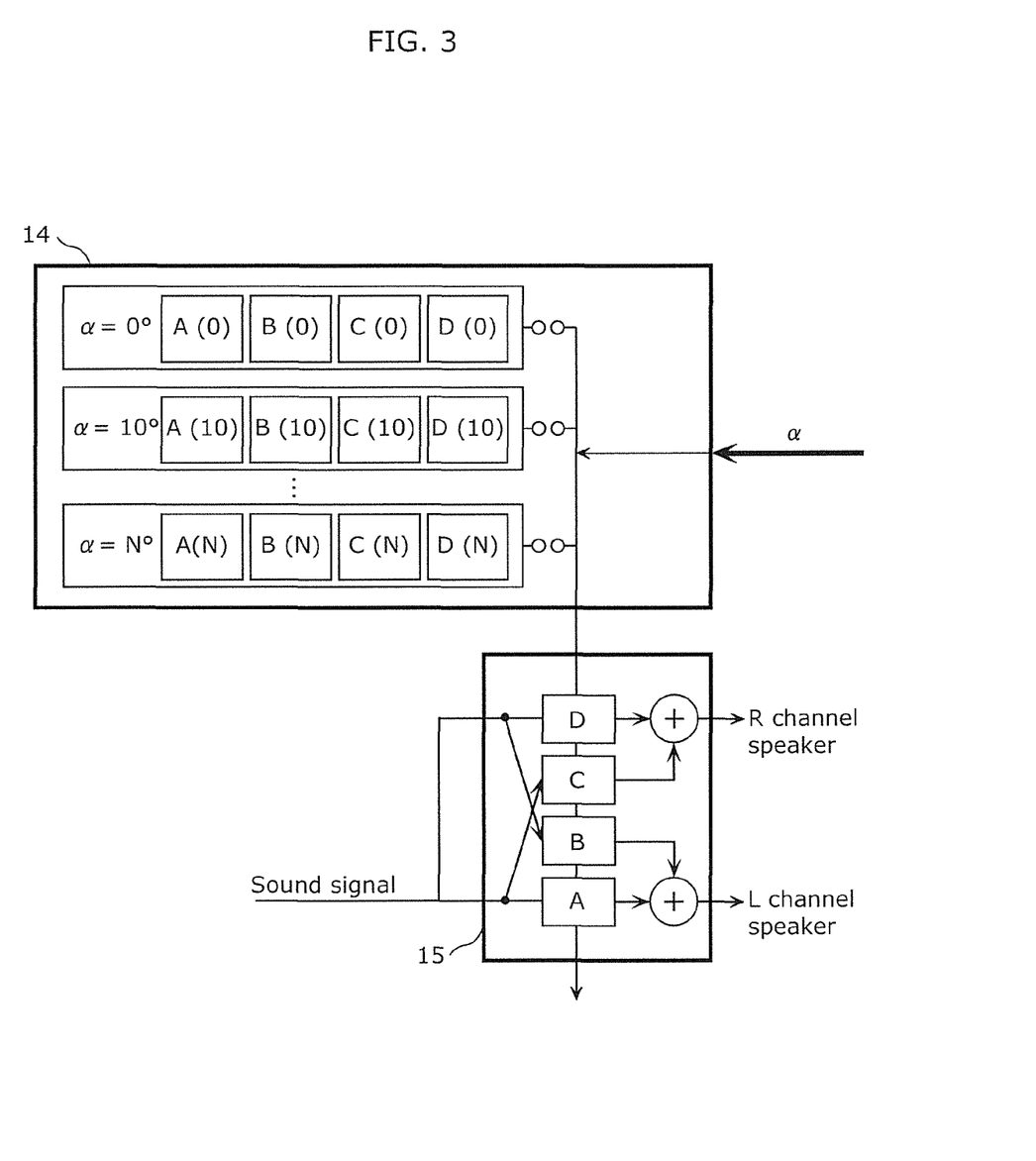
FIG. 3 is a block diagram illustrating structures of a control unit and a signal processing unit according to Embodiment 1.

FIG. 3 is a block diagram illustrating the structures of the control unit 14 and the signal processing unit 15 according to this embodiment.

As illustrated in FIG. 3, the filter coefficients determined in the control unit 14 are coefficients corresponding to the filter coefficients A, B, C, and D described above with reference to FIG. 11. The control unit 14 stores, for example, filter coefficients A(0), B(0), C(0), and D(0) corresponding to the case where the steering angle α is 0 degrees. Filter coefficients selected depending on the steering angle α are denoted as A(α), B(α), C(α), and D(α). The control unit 14 stores, in addition to the filter coefficients corresponding to the case where the steering angle α is 0 degrees, filter coefficients corresponding to the case where the steering angle α is 10 degrees, filter coefficients corresponding to the case where the steering angle α is 20 degrees, . . . , and filter coefficients corresponding to the case where the steering angle α is N degrees. The control unit 14 outputs the filter coefficients selected based on the signal indicating the steering angle α received from the steering angle detection unit 13, to the signal processing unit 15. Although the control unit 14 stores the filter coefficients corresponding to each steering angle α in the example in FIG. 3, the control unit 14 may generate the filter coefficients corresponding to the steering angle α each time the control unit 14 receives the signal indicating the steering angle α from the steering angle detection unit 13.

The signal processing unit 15 is a processing unit that performs the process on the sound signal using the filter coefficients determined by the control unit 14 to generate the plurality of output signals. More specifically, the signal processing unit 15 performs, on the sound signal received from the sound signal storage unit 16, the process using the filter coefficients A(α), B(α), C(α), and D(α) received from the control unit 14, to generate the plurality of output signals, as illustrated in FIG. 3. The signal processing unit 15 outputs the plurality of output signals to the respective plurality of speakers. Thus, the plurality of output signals corresponding to the sound signal can be generated by the signal processing unit 15, so that the plurality of output signals need not be stored in the acoustic device 1. This reduces the amount of data stored in the acoustic device 1.

The sound signal storage unit 16 is a storage unit that stores at least one sound signal reproduced by the acoustic device 1. The sound signal includes information of sound to be heard by the driver. For example, the sound signal may include sound information such as an alert sound to alert the driver or a message to notify the driver of traffic conditions.

[1-2. Operations]

The operations of the acoustic device 1 according to this embodiment will be described below, with reference to drawings.

Figure 4:
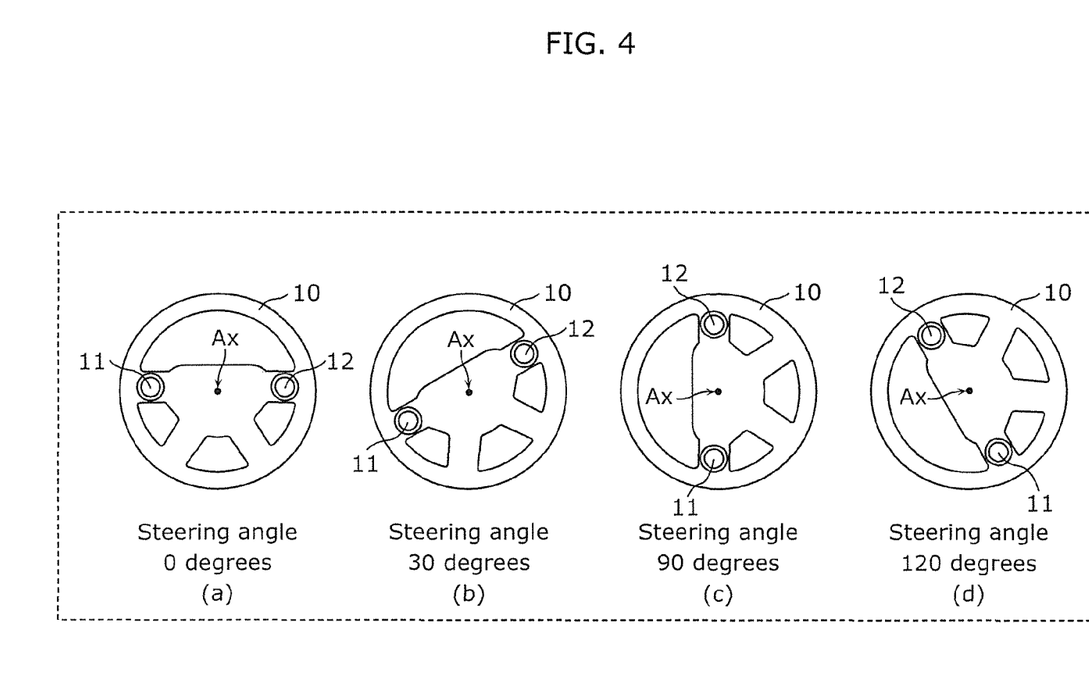
FIG. 4 is a schematic diagram illustrating the relationship between the steering angle and the state of the steering wheel in the acoustic device according to Embodiment 1.

FIG. 4 is a schematic diagram illustrating the relationship between the steering angle α and the state of the steering wheel 10 in the acoustic device 1 according to this embodiment.

First, the steering angle detection unit 13 detects the steering angle α. Suppose the steering angle α detected by the steering angle detection unit 13 is 0 degrees (i.e. the state in which the car is traveling in a straight line). (a) in FIG. 4 illustrates the state of the steering wheel 10 in the case where the steering angle α is 0 degrees. The driver is expected to be in front of the steering wheel. Therefore, in the case where the steering angle α is 0 degrees, the L channel speaker 11 and the R channel speaker 12 are in a positional relationship of bilateral symmetry with respect to the rotation axis Ax of the steering wheel 10 as seen from the driver. In this case, the control unit 14 selects filter coefficients corresponding to the case where the plurality of speakers are arranged bilaterally symmetrically from the filter coefficients generated beforehand, for example as the filter coefficients for providing the stereophonic effect to produce sound near the ears of the driver. The control unit 14 may generate the filter coefficients corresponding to the case where the plurality of speakers are arranged bilaterally symmetrically.

The derivation of filter coefficients in the control unit 14 will be described below, with reference to drawings.

Figure 5:
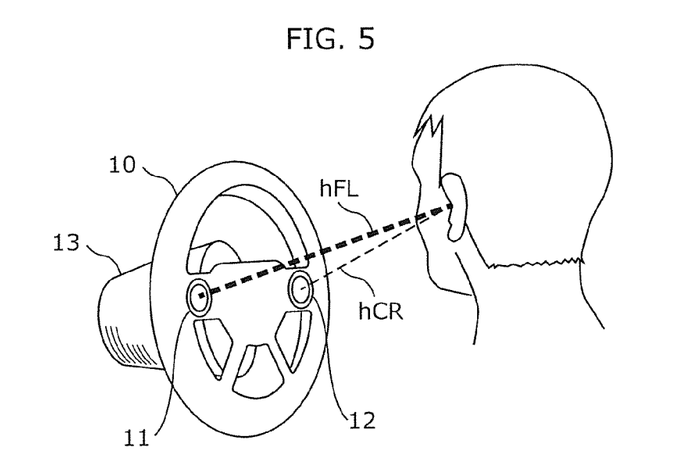
FIG. 5 is a schematic diagram illustrating the positional relationship between an L channel speaker and an R channel speaker and a listener (driver) in the case where the steering angle is 0 degrees.

FIG. 5 is a schematic diagram illustrating the positional relationship between the L channel speaker 11 and the R channel speaker 12 and the listener (driver) in the case where the steering angle α is 0 degrees. A transfer function hFL (designated by a thick dashed line) in FIG. 5 corresponds to the transfer function hFL in FIG. 11 described in the Background Art section. A transfer function hCR (designated by a thin dashed line) in FIG. 5 corresponds to the transfer function hCR in FIG. 11. The transfer function hFL is a function indicating the transfer characteristics of sound from the L channel speaker 11 to the left ear of the driver. The transfer function hCR is a function indicating the transfer characteristics of sound from the R channel speaker 12 to the left ear of the driver. Each transfer function may be determined by calculation from the geometric positional relationship between the corresponding speaker and the driver, or by measurement using the speaker and a microphone arranged in such a positional relationship. Although not illustrated, a transfer function hFR is a function indicating the transfer characteristics of sound from the R channel speaker 12 to the right ear of the driver, and a transfer function hCL is a function indicating the transfer characteristics of sound from the L channel speaker 11 to the right ear of the driver. The transfer functions hFR and hCL are determined by calculation or measurement, as with the transfer functions hFL and hCR. The method of obtaining the filter coefficients A(0), B(0), C(0), and D(0) from hFL, hCR, hFR, and hCL determined beforehand in this way is as described in the Background Art section. Although the same method as that described in the Background Art section is used as the filter coefficient derivation method here, this derivation method is merely an example, and any known method in stereophonic processing technologies may be used.

The signal processing unit 15 then reads the sound signal from the sound signal storage unit 16, and processes the sound signal using the filter coefficients A(0), B(0), C(0), and D(0) received from the control unit 14.

As illustrated in FIG. 3, the control unit 14 stores the filter coefficients A(α), B(α), C(α), and D(α) determined beforehand for each predetermined steering angle α by the method described above. The control unit 14 selects appropriate filter coefficients based on a signal indicating the value of the steering angle α received from the steering angle detection unit 13, and sends the filter coefficients to the signal processing unit 15. The signal processing unit 15 performs signal processing including a crosstalk cancellation process, using these filter coefficients. Thus, crosstalk can be suppressed in the acoustic device 1. This prevents degradation of the stereophonic effect provided by the acoustic device 1.

In the case where the steering angle is 0 degrees, the control unit 14 selects the filter coefficients A(0), B(0), C(0), and D(0), and sends the filter coefficients to the signal processing unit 15. The signal processing unit 15 sets A(0), B(0), C(0), and D(0) respectively as the filter coefficients A, B, C, and D, and processes the sound signal using the filter coefficients A(0), B(0), C(0), and D(0) to generate a plurality of output signals. In this embodiment, the signal processing unit 15 generates two output signals.

The two output signals generated in this way are respectively input to the L channel speaker 11 and the R channel speaker 12. The L channel speaker 11 and the R channel speaker 12 reproduce the two output signals, as a result of which sound with a stereophonic effect is provided to the driver.

The operation in the case where the steering angle α of the steering wheel 10 is 30 degrees will be described below. (b) in FIG. 4 illustrates the state in which the steering angle α of the steering wheel 10 is 30 degrees.

In this case, the steering angle detection unit 13 detects that the steering angle α of the steering wheel 10 is 30 degrees.

The control unit 14 selects filter coefficients corresponding to a steering angle α of 30 degrees, i.e. A(30), B(30), C(30), and D(30), from the filter coefficients generated beforehand. How the filter coefficients are derived will be described below, with reference to drawings.

Figure 6:
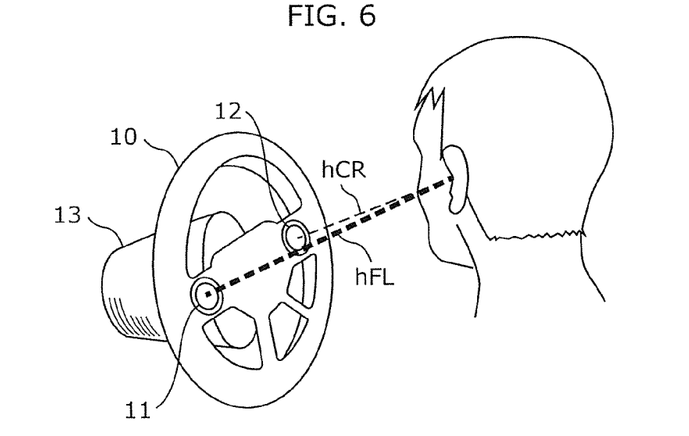
FIG. 6 is a schematic diagram illustrating the positional relationship between the L channel speaker and the R channel speaker and the listener (driver) in the case where the steering angle is 30 degrees.

FIG. 6 is a schematic diagram illustrating the positional relationship between the L channel speaker 11 and the R channel speaker 12 and the listener (driver) in the case where the steering angle α is 30 degrees.

In this embodiment, a plurality of output signals output by the signal output unit 2 in the case where the steering angle α is not 0 degrees result from processing for providing the same (i.e. identical or similar) stereophonic effect as in the case where the steering angle α is 0 degrees. Thus, even in the case where the positions of the plurality of speakers have changed from the positions in the case where the steering angle is 0 degrees, the same stereophonic effect as in the case where the steering angle is 0 degrees can be provided.

A transfer function hFL (designated by a thick dashed line) in FIG. 6 corresponds to the transfer function hFL in FIG. 11 described in the Background Art section. A transfer function hCR (designated by a thin dashed line) in FIG. 6 corresponds to the transfer function hCR in FIG. 11. The transfer function hFL is a function indicating the transfer characteristics of sound from the L channel speaker 11 to the left ear of the driver as the listener. The transfer function hCR is a function indicating the transfer characteristics of sound from the R channel speaker 12 to the left ear of the driver. Each transfer function may be determined by calculation from the geometric positional relationship between the corresponding speaker and the driver, or by measurement using the speaker and a microphone arranged in such a positional relationship. Although not illustrated, a transfer function hFR is a function indicating the transfer characteristics of sound from the R channel speaker 12 to the right ear of the driver, and a transfer function hCL is a function indicating the transfer characteristics of sound from the L channel speaker 11 to the right ear of the driver. The transfer functions hFR and hCL are determined by calculation or measurement, as with the transfer functions hFL and hCR. The method of obtaining the filter coefficients A(30), B(30), C(30), and D(30) from hFL, hCR, hFR, and hCL determined beforehand in this way is as described in the Background Art section.

In the determination of hFL, hCR, hFR, and hCL by calculation or measurement described above, the positions of the plurality of speakers mounted on the steering wheel 10 change with the rotation of the steering wheel 10, as illustrated in FIG. 2. Given that the steering wheel 10 is rotated by the steering angle α about the rotation axis Ax at its center position, the L channel speaker 11 located at a distance r from the rotation axis Ax moves downward by r×sin α, and also moves to the inner side of the steering wheel 10 (the right side as seen from the driver) by r(1−cos α). Meanwhile, the R channel speaker 12 located at the distance r from the rotation axis Ax moves upward by r×sin α, and also moves to the inner side of the steering wheel 10 (the left side as seen from the driver) by r(1−cos α). The transfer functions can be calculated or measured depending on the thus determined geometric positional relationships between the plurality of speakers and the left and right ears of the driver.

The signal processing unit 15 then reads the sound signal from the sound signal storage unit 16, and processes the sound signal using the filter coefficients A(30), B(30), C(30), and D(30) received from the control unit 14. Thus, two output signals corresponding to the case where the steering angle α is 30 degrees are generated.

The two output signals generated in this way are respectively input to the L channel speaker 11 and the R channel speaker 12. Consequently, sound with a stereophonic effect is provided to the driver.

The operation in the case where the steering angle α of the steering wheel 10 is 90 degrees will be described below. (c) in FIG. 4 illustrates the state in which the steering angle α of the steering wheel 10 is 90 degrees.

In this case, the steering angle detection unit 13 detects that the steering angle α of the steering wheel 10 is 90 degrees.

In the case where the steering angle α is 0 degrees, the L channel speaker 11 and the R channel speaker 12 are arranged bilaterally symmetrically, as illustrated in (a) in FIG. 4. In the case where the steering angle is 90 degrees, the L channel speaker 11 and the R channel speaker 12 are arranged below and above the rotation axis Ax, as illustrated in (c) in FIG. 4. In such a case, the sound output from each speaker is equally transmitted to the left and right ears of the driver, from the viewpoint of the driver. A stereophonic effect is perceived through the phase difference or the volume difference between the sound reaching the left ear and the sound reaching the right ear. Accordingly, in the case where the steering angle α is 90 degrees, a stereophonic effect cannot be provided. In this case, the control unit 14 generates filter coefficients that do not provide a stereophonic effect, typically, filter coefficients with transfer characteristics of 1. For example, A(90)=1, B(90)=0, C(90)=0, and D(90)=1. Alternatively, monaurally converted sound may be output by setting A(90)=1/2, B(90)=1/2, C(90)=1/2, and D(90)=1/2.

The signal processing unit 15 then reads the sound signal from the sound signal storage unit 16, and processes the sound signal using the filter coefficients A(90), B(90), C(90), and D(90) received from the control unit 14. Thus, two output signals corresponding to the case where the steering angle α is 90 degrees are generated.

The two output signals generated in this way are respectively input to the L channel speaker 11 and the R channel speaker 12. Consequently, sound without a stereophonic effect is provided to the driver. By performing such a process in the signal processing unit 15, processing can be simplified as compared with the case of performing the process for providing a stereophonic effect.

Although the acoustic device 1 has a structure of not providing a stereophonic effect in the case where the steering angle α is 90 degrees in this embodiment, the structure of the acoustic device 1 is not limited to this. In the case where the steering angle α is greater than a predetermined angle that is less than 90 degrees, the driver cannot perceive any substantial difference between the sound reaching the left ear and the sound reaching the right ear. Filter coefficients that do not provide a stereophonic effect may be used in such a case. For example, the predetermined angle is about 80 degrees. Filter coefficients that do not provide a stereophonic effect may be used in the case where the steering angle α is in a predetermined angle range. For example, filter coefficients that do not provide a stereophonic effect may be used in the case where the steering angle α is greater than 80 degrees and less than 100 degrees.

The operation in the case where the steering angle α of the steering wheel 10 is 120 degrees will be described below. (d) in FIG. 4 illustrates the state in which the steering angle α of the steering wheel 10 is 120 degrees.

In this case, the steering angle detection unit 13 detects that the steering angle α is 120 degrees.

In the case where the steering angle α is 120 degrees, the L channel speaker 11 and the R channel speaker 12 arranged respectively on the left side and the right side as seen from the driver in the case where the steering angle α is 0 degrees are arranged respectively on the right side and the left side, as illustrated in (d) in FIG. 4. In this case, the control unit 14 selects filter coefficients obtained by left-right reversing the filter coefficients selected in the case where the steering angle α is 60 degrees. In detail, the filter coefficients used in the processing of the output signals output to the L channel speaker 11 in the case where the steering angle α is 60 degrees are used in the processing of the output signals output to the R channel speaker 12, and the filter coefficients used in the processing of the output signals output to the R channel speaker 12 in the case where the steering angle α is 60 degrees are used in the processing of the output signals output to the L channel speaker 11. In this case, A(120)=C(60), B(120)=D(60), C(120)=A(60), and D(120)=B(60).

The signal processing unit 15 then reads the sound signal from the sound signal storage unit 16, and processes the sound signal using the filter coefficients A(120), B(120), C(120), and D(120) received from the control unit 14. Thus, two output signals corresponding to the case where the steering angle α is 120 degrees are generated.

The two output signals generated in this way are respectively input to the L channel speaker 11 and the R channel speaker 12. Consequently, sound with a stereophonic effect is provided to the driver.

This embodiment describes an example of performing the process with the filter coefficients used for the left and right output signals being reversed in the case where the steering angle α is greater than 90 degrees. In cars, however, the time during which the steering angle α is greater than 90 degrees typically does not last long, and accordingly a stereophonic effect may not be provided in the case where the steering angle α is greater than 90 degrees. Alternatively, the provision of sound to the driver may be stopped. In ships and the like, on the other hand, the time during which the steering angle is greater than 90 degrees can last long, and therefore a stereophonic effect with left-right reversal is preferably provided. Even in cars, the time during which the steering angle is greater than 90 degrees can last long in the case of, for example, backing the car into the garage. In such a case, such sound that warns the driver of any entanglement, urges the driver to check rearward, etc., may be provided to the driver using a stereophonic effect.

[1-3. Conclusion]

As described above, the acoustic device 1 according to this embodiment is an acoustic device that provides a stereophonic effect to a driver of a mobile object. The acoustic device 1 includes: a plurality of speakers mounted on a steering wheel 10 that controls a traveling direction of the mobile object; a steering angle detection unit 13 configured to detect a steering angle α of the steering wheel 10; and a signal output unit 2 configured to output a plurality of output signals obtained by performing, on a sound signal, a process relating to the stereophonic effect and depending on the steering angle α, respectively to the plurality of speakers.

With this, even in the case where the steering angle α of the steering wheel 10 is not 0 degrees, i.e. the positions of the plurality of speakers have changed from the positions in the case where the steering angle α is 0 degrees, the desired stereophonic effect can be provided to the driver by performing the process depending on the steering angle α to obtain the plurality of output signals. Moreover, by mounting the speakers on the steering wheel, obstacles between the speakers and the driver can be reduced, with it being possible to provide the stereophonic effect more reliably.

In the acoustic device 1, the signal output unit 2 may include: a sound signal storage unit 16 configured to store the sound signal; a control unit 14 configured to determine filter coefficients for the process depending on the steering angle α; and a signal processing unit 15 configured to perform the process on the sound signal using the filter coefficients, to generate the plurality of output signals.

With this, the plurality of output signals corresponding to the sound signal can be generated by the signal processing unit 15, so that the plurality of output signals need not be stored in the acoustic device 1. This reduces the amount of data stored in the acoustic device 1.

In the acoustic device 1, the signal processing unit 15 may be configured to further perform a crosstalk cancellation process on the sound signal.

With this, crosstalk can be suppressed in the acoustic device 1. This prevents degradation of the stereophonic effect provided by the acoustic device 1.

In the acoustic device 1, the plurality of output signals output by the signal output unit 2 in the case where the steering angle α is not 0 may be obtained by performing the process for providing a same stereophonic effect as in the case where the steering angle α is 0.

With this, even in the case where the positions of the plurality of speakers have changed from the positions in the case where the steering angle α is 0 degrees, the same stereophonic effect as in the case where the steering angle α is 0 degrees can be provided.

In the acoustic device 1, the signal output unit 2 may be configured to, in the case where the steering angle α is greater than a predetermined angle, output the plurality of output signals that do not provide the stereophonic effect.

With this, in the case where the plurality of speakers are at positions where the stereophonic effect cannot be provided to the driver, the provision of the stereophonic effect can be stopped. This simplifies the process performed for the output signals in the acoustic device 1.

In the acoustic device 1, at least two speakers of the plurality of speakers may be arranged on a same arc Ar centered on a rotation axis Ax of the steering wheel 10, and the at least two speakers may be at a same vertical position in the case where the steering angle α is 0.

With this, the speakers are arranged bilaterally symmetrically with respect to the driver located near the rotation axis Ax of the steering wheel 10. A speaker arrangement that facilitates the provision of the stereophonic effect can thus be realized.

In the acoustic device 1, at least two speakers of the plurality of speakers may be arranged symmetrically with respect to a point on a rotation axis Ax of the steering wheel 10.

With this, the speakers are arranged on both sides of the rotation axis Ax of the steering wheel 10. Even when the steering wheel 10 is rotated, the two speakers will not be located off to the right side or the left side with respect to the rotation axis Ax. A speaker arrangement that facilitates the provision of the stereophonic effect can thus be realized.

In the acoustic device 1, the plurality of speakers may be arranged symmetrically with respect to a vertical plane including a rotation axis Ax of the steering wheel 10 in the case where the steering angle α is 0 degrees.

With this, the speakers are arranged bilaterally symmetrically with respect to the driver located near the rotation axis Ax of the steering wheel 10. A speaker arrangement that facilitates the provision of the stereophonic effect can thus be realized.

The arrangement of the plurality of speakers mounted on the steering wheel 10 is not limited to the arrangement illustrated in FIG. 2 and the like. Other arrangement examples of the plurality of speakers will be described below, with reference to drawings.

Figure 7:
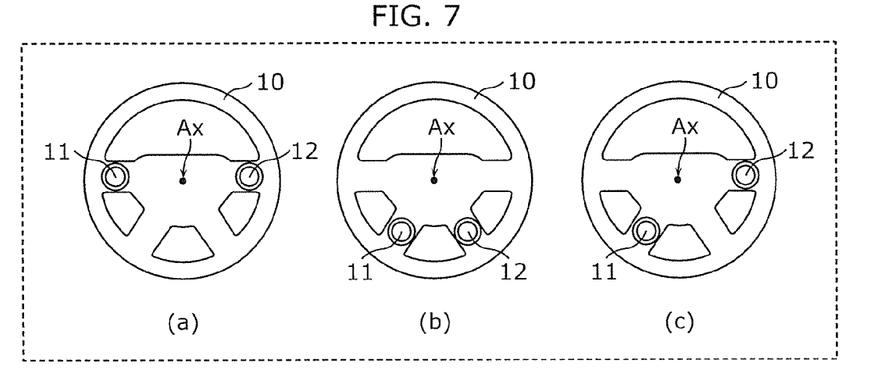
FIG. 7 is a schematic diagram illustrating arrangement examples of a plurality of speakers according to Embodiment 1.

FIG. 7 is a schematic diagram illustrating arrangement examples of the plurality of speakers according to this embodiment.

As illustrated in (a) in FIG. 7, the L channel speaker 11 and the R channel speaker 12 are arranged symmetrically with respect to a point on the rotation axis Ax of the steering wheel 10. In this case, even when the steering wheel 10 is rotated, the two speakers will not be located off to the right side or the left side simultaneously, as mentioned above. This facilitates the provision of the stereophonic effect.

As illustrated in (b) in FIG. 7, even though the L channel speaker 11 and the R channel speaker 12 are not arranged symmetrically with respect to a point on the rotation axis Ax of the steering wheel 10, the L channel speaker 11 and the R channel speaker 12 may be arranged bilaterally symmetrically in the case where the steering angle α is 0 degrees. This is because the steering angle of the steering wheel of a car during driving is mainly 0 degrees, and, even in the speaker arrangement illustrated in (b) in FIG. 7, the two speakers are unlikely to be located off to the right side or the left side of the rotation axis Ax of the steering wheel 10.

In the example illustrated in (c) in FIG. 7, the L channel speaker 11 and the R channel speaker 12 are not arranged bilaterally symmetrically in the case where the steering angle α is 0 degrees. A stereophonic effect is perceived through the phase difference or the volume difference between the sound reaching the listener's left ear and the sound reaching the listener's right ear. Accordingly, with the speaker arrangement example illustrated in (c) in FIG. 7, the stereophonic effect can degrade. To provide the stereophonic effect more reliably, the speaker arrangement is preferably bilaterally symmetric.

Embodiment 2

Embodiment 2 will be described below. An acoustic device according to this embodiment differs from the acoustic device 1 according to Embodiment 1 in the structure of the signal output unit. The acoustic device according to this embodiment will be described below with reference to drawings, mainly focusing on the differences from the acoustic device 1 according to Embodiment 1.

Figure 8:
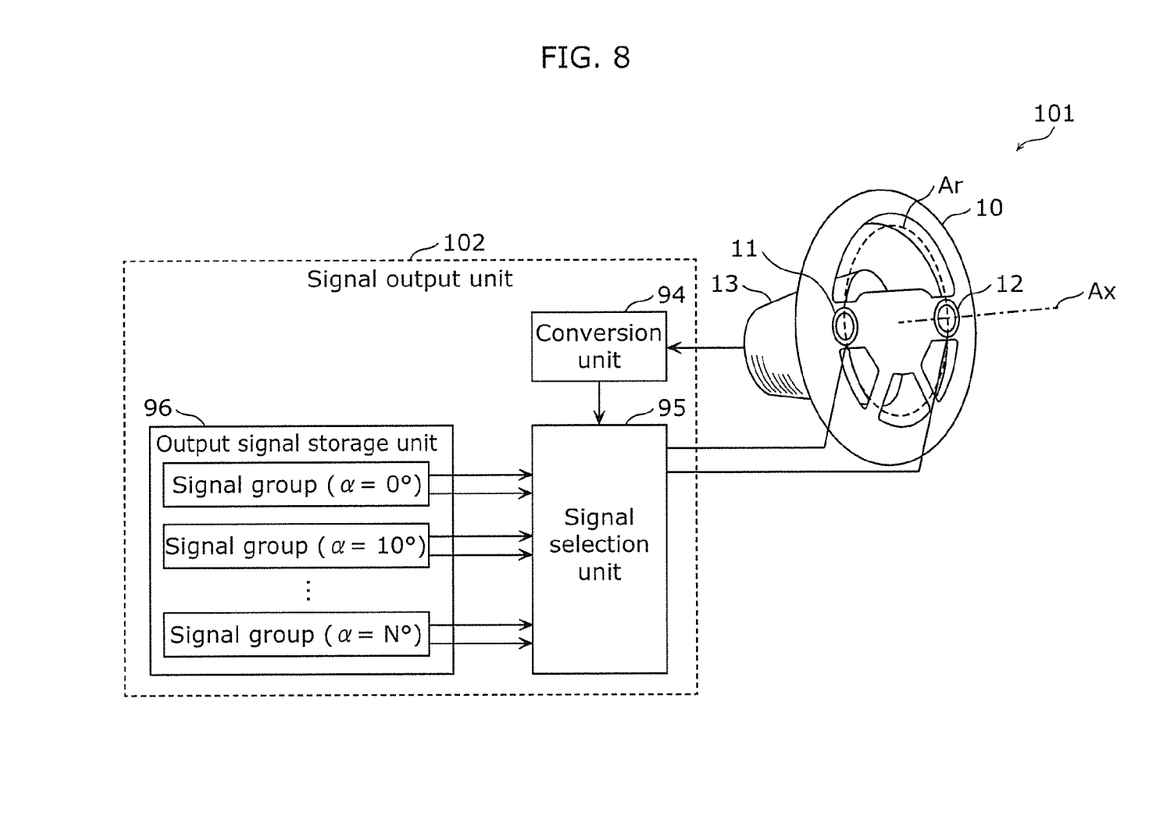
FIG. 8 is a block diagram illustrating the functional structure of an acoustic device according to Embodiment 2.

FIG. 8 is a block diagram illustrating the functional structure of the acoustic device 101 according to this embodiment.

As illustrated in FIG. 8, the acoustic device 101 includes the plurality of speakers (the L channel speaker 11 and the R channel speaker 12), the steering angle detection unit 13, and a signal output unit 102, as in the acoustic device 1 according to Embodiment 1.

In this embodiment, the signal output unit 102 includes a conversion unit 94, a signal selection unit 95, and an output signal storage unit 96.

The conversion unit 94 is a processing unit that outputs a steering angle index corresponding to the steering angle α detected by the steering angle detection unit 13 to the signal selection unit 95. The steering angle index is an identification symbol corresponding to the steering angle α. The conversion unit 94 receives a signal indicating the value of the steering angle α detected by the steering angle detection unit 13, and determines the steering angle index corresponding to the steering angle α.

The output signal storage unit 96 is a storage unit that stores a plurality of signal groups respectively associated with a plurality of different steering angles α. The plurality of signal groups each include a plurality of output signals. The plurality of output signals are signals obtained by performing, on a sound signal, a process relating to a stereophonic effect and depending on the steering angle α, and are output to the respective plurality of speakers, as with the plurality of output signals according to Embodiment 1. More specifically, the plurality of output signals are signals generated by performing, on the sound signal, the process using filter coefficients stored in the control unit 14 according to Embodiment 1.

The signal selection unit 95 is a processing unit that selects a signal group corresponding to the steering angle α detected by the steering angle detection unit 13 from the plurality of signal groups stored in the output signal storage unit 96. The signal selection unit 95 outputs the plurality of output signals included in the selected signal group, to the respective plurality of speakers. More specifically, the signal selection unit 95 selects a signal group corresponding to the steering angle index received from the conversion unit 94, from the plurality of signal groups. The plurality of signal groups stored in the output signal storage unit 96 are each associated with a different steering angle index. The signal selection unit 95 selects the signal group corresponding to the steering angle α, based on the steering angle index received from the conversion unit 94.

As described above, in the acoustic device 101 according to this embodiment, the signal output unit 102 includes: an output signal storage unit 96 configured to store a plurality of signal groups respectively associated with a plurality of different steering angles α; and a signal selection unit 95 configured to select one signal group corresponding to the steering angle α detected by the steering angle detection unit 13, from the plurality of signal groups, and the plurality of signal groups each include the plurality of output signals.

Since the plurality of output signals are stored beforehand as signal groups in the output signal storage unit 96 in the signal output unit 102, computation for generating the output signals is unnecessary. Computation in the signal output unit 102 can therefore be reduced.

(Variations, Etc.)

While Embodiments 1 and 2 have been described above to illustrate the disclosed technology, the disclosed technology is not limited to such. Changes, replacements, additions, omissions, etc. may be made to each embodiment as appropriate, and structural elements described in Embodiments 1 and 2 may be combined as a new embodiment.

The general and specific aspects of the acoustic device according to each of the foregoing embodiments may be implemented using a system, a method, an integrated circuit, a computer program, or a computer-readable recording medium such as CD-ROM, or any combination of systems, methods, integrated circuits, computer programs, and recording media.

For example, the structural elements (the signal processing unit 15, etc.) in the acoustic device 1 according to Embodiment 1 of the present disclosure may be implemented by software such as a program executed on a computer including a central processing unit (CPU), random access memory (RAM), ROM, a communication interface, an I/O port, a hard disk, a display, etc., or implemented by hardware such as electronic circuitry.

Each of the structural elements in each of the foregoing embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or semiconductor memory.

The foregoing embodiments are intended to be illustrative of the disclosed technology, and so various changes, replacements, additions, omissions, etc. can be made within the scope of the appended Claims and their equivalents.

For example, although each of the foregoing embodiments describes the case where the process for not providing the stereophonic effect is performed on the sound signal when the steering angle α is about 90 degrees and the left and right speakers are aligned in the vertical direction, the provision of the stereophonic effect may be suppressed in other cases. For example, the signal output unit may be configured to, in the case where a variation of the steering angle α per unit time is greater than a predetermined value, output the plurality of output signals processed so as not to provide the stereophonic effect. In this case, the positions of the plurality of speakers relative to the driver change from moment to moment, making it difficult to ensure the provision of the stereophonic effect. In such a case where the provision of the stereophonic effect is practically difficult, the provision of the stereophonic effect is stopped. This simplifies the process performed for the output signals in the acoustic device 1.

Figure 9:
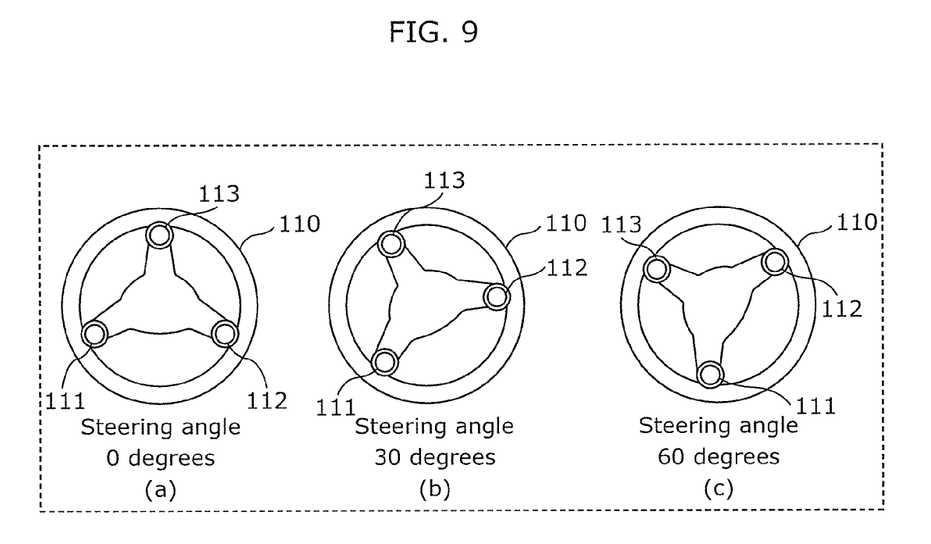
FIG. 9 is a schematic diagram illustrating an arrangement of speakers mounted on the steering wheel according to a variation.

Although each of the foregoing embodiments describes the case where two speakers aligned in the horizontal direction in the case where the steering angle α is 0 degrees are mounted on the steering wheel 10, three or more speakers may be mounted on the steering wheel 10. FIG. 9 is a schematic diagram illustrating an arrangement of speakers mounted on a steering wheel 110 according to this variation. (a) in FIG. 9 illustrates an arrangement of three speakers 111, 112, and 113 in the case where the steering angle α is 0 degrees. In this case, the speakers 111 and 112 aligned in the horizontal direction are used so that the speaker 111 outputs sound based on an output signal of left ch contributing to the stereophonic effect and the speaker 112 outputs sound based on an output signal of right ch contributing to the stereophonic effect. The speaker 113 outputs sound based on an output signal not contributing to the stereophonic effect, or does not output sound.

(b) in FIG. 9 illustrates an arrangement of the three speakers 111, 112, and 113 in the case where the steering angle α is 30 degrees. In this case, exploiting the fact that the midpoint between the speakers 113 and 111 and the speaker 112 are aligned in the horizontal direction, the speakers 111 and 113 output sound based on an output signal of left ch contributing to the stereophonic effect, and the speaker 112 outputs sound based on an output signal of right ch contributing to the stereophonic effect.

(c) in FIG. 9 illustrates an arrangement of the three speakers 111, 112, and 113 in the case where the steering angle α is 60 degrees. In this case, the speakers 112 and 113 aligned in the horizontal direction can be used. For example, the speaker 113 outputs sound based on an output signal of left ch contributing to the stereophonic effect and the speaker 112 outputs sound based on an output signal of right ch contributing to the stereophonic effect. The speaker 111 outputs sound based on an output signal not contributing to the stereophonic effect, or does not output sound.

Thus, three or more speakers may be mounted on the steering wheel, and a plurality of speakers aligned in the horizontal direction from among the speakers moving with a change in steering angle α may be used to provide the stereophonic effect.

The acoustic device according to the present disclosure may be used in a mobile object such as the vehicle 50 illustrated in FIG. 10. That is, the mobile object may include the steering wheel 10 and the acoustic device according to the present disclosure. Such a mobile object can achieve the same effects as the acoustic device according to the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The presently disclosed technique can be used in an acoustic device for a mobile object (e.g. a car, a ship, etc.) including a steering wheel, for example, to alert the driver by sound. In particular, the presently disclosed technique can be used as an acoustic device capable of enhancing the alert effect by producing an alert sound near the driver's ear.

The invention claimed is:

1. An acoustic device that provides a stereophonic effect to a driver of a mobile object, the acoustic device comprising:
a plurality of speakers mounted on a steering wheel that controls a traveling direction of the mobile object;
a steering angle detector configured to detect a steering angle of the steering wheel; and
a signal processor configured to:
in a case where the steering angle is equal to or smaller than a predetermined angle, output a plurality of stereophonic signals that provide the stereophonic effect obtained by performing, on a sound signal, a process relating to the stereophonic effect, respectively to the plurality of speakers, and
in the case where the steering angle is greater than a predetermined angle, output a plurality of non-stereophonic signals that provide no stereophonic effect, respectively to the plurality of speakers.

2. The acoustic device according to claim 1, wherein at least two speakers of the plurality of speakers are arranged on a same arc centered on a rotation axis of the steering wheel, and
the at least two speakers are at a same vertical position in the case where the steering angle is 0.

3. The acoustic device according to claim 1, wherein at least two speakers of the plurality of speakers are arranged symmetrically with respect to a point on a rotation axis of the steering wheel.

4. The acoustic device according to claim 1, wherein the plurality of speakers are arranged symmetrically with respect to a vertical plane including a rotation axis of the steering wheel in the case where the steering angle is 0.

5. A mobile object comprising:
the acoustic device according to claim 1; and
the steering wheel.

6. An acoustic device that provides a stereophonic effect to a driver of a mobile object, the acoustic device comprising:
a plurality of speakers mounted on a steering wheel that controls a traveling direction of the mobile object;
a steering angle detector configured to detect a steering angle of the steering wheel; and
a signal processor configured to:
in the case where a variation of the steering angle per unit time is equal to or smaller than a predetermined value, output a plurality of stereophonic signals that provide the stereophonic effect obtained by performing, on a sound signal, a process relating to the stereophonic effect, respectively to the plurality of speakers, and
in the case where a variation of the steering angle per unit time is greater than a predetermined value, output a plurality of non-stereophonic signals that provides no stereophonic effect, respectively to the plurality of speakers.

* * * * *